United States Patent
Thayer et al.

(10) Patent No.: US 7,694,193 B2
(45) Date of Patent: Apr. 6, 2010

(54) SYSTEMS AND METHODS FOR IMPLEMENTING A STRIDE VALUE FOR ACCESSING MEMORY

(75) Inventors: Larry J. Thayer, Fort Collins, CO (US); Andrew C. Walton, Rocklin, CA (US); Mike H. Cogdill, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 578 days.

(21) Appl. No.: 11/685,395

(22) Filed: Mar. 13, 2007

(65) Prior Publication Data

US 2008/0229035 A1     Sep. 18, 2008

(51) Int. Cl.
G11C 29/00 (2006.01)
G06F 11/00 (2006.01)
G06F 12/06 (2006.01)
G06F 13/00 (2006.01)

(52) U.S. Cl. ............... 714/718; 714/739; 714/763; 711/5; 711/100; 711/157

(58) Field of Classification Search ............ 714/702, 714/718, 728, 738, 739, 741, 763; 711/1, 711/5, 100, 127, 157, 217
See application file for complete search history.

(56) References Cited

U.S. PATENT DOCUMENTS

| | | | |
|---|---|---|---|
| 5,247,645 A | 9/1993 | Mirza et al. | |
| 6,145,027 A | 11/2000 | Seshan et al. | |
| 6,311,234 B1 | 10/2001 | Seshan et al. | |
| 6,332,186 B1 * | 12/2001 | Elwood et al. | 711/217 |
| 6,381,669 B1 * | 4/2002 | Chudnovsky et al. | 711/5 |
| 6,519,673 B1 * | 2/2003 | Chudnovsky et al. | 711/5 |
| 6,681,293 B1 | 1/2004 | Solomon et al. | |
| 6,717,576 B1 | 4/2004 | Duluk, Jr. et al. | |
| 6,748,480 B2 * | 6/2004 | Chudnovsky et al. | 711/5 |
| 7,100,019 B2 * | 8/2006 | Norris et al. | 712/7 |
| 7,167,181 B2 | 1/2007 | Duluk, Jr. et al. | |

* cited by examiner

Primary Examiner—Phung M Chung

(57) ABSTRACT

Systems and methods for implementing a stride value for memory are provided. One embodiment includes a system comprising a plurality of memory modules configured to store interleaved data in a plurality of memory storage units according to a predetermined interleave. The plurality of memory storage units can be defined by a memory range of consecutive addresses. The system also comprises a memory test device configured to access a portion of the plurality of memory storage units in a sequence that repeats according to a programmable stride value.

17 Claims, 4 Drawing Sheets

SYSTEMS AND METHODS FOR IMPLEMENTING A STRIDE VALUE FOR ACCESSING MEMORY

BACKGROUND

Hardware based memory test devices, such as memory testers and memory scrubbers, can be programmed to test data and detect and correct errors in data, respectively, for a gives memory range. Data in a given memory range is typically interleaved amongst a plurality of memory modules, such as dual-inline memory modules (DIMMs). For example, a memory range of consecutive addresses can be interleaved across different physical memory modules. In the event that a given one of the memory modules fails, a hardware based memory test device may stop and require a reset every time it accesses data that is stored on the failed memory module. Such stop and reset actions could require extensive interactions between the operating firmware and the hardware based memory test device, which could potentially negate performance advantages of the device and result in longer boot times.

DETAILED DESCRIPTION

Figure 1:
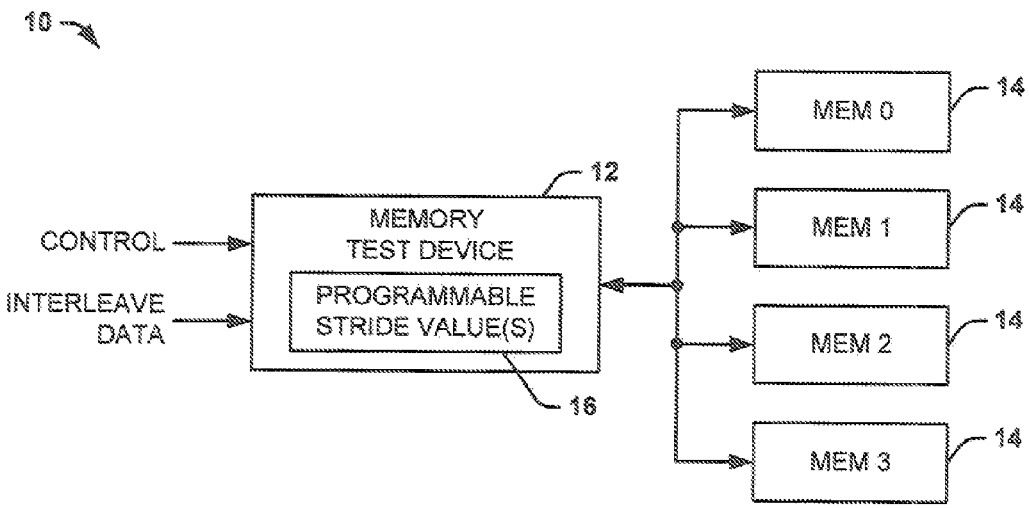
FIG. 1 depicts an example embodiment of a system to control access to interleaved memory.

FIG. 1 depicts an example embodiment of a system 10 to control access to interleaved memory. The system 10 includes a memory test device 12, which could be, for example, a memory tester and/or a memory scrubber. As such, the memory test device 12 can be configured to test memory and/or detect and correct errors residing in memory. The memory test device 12 could be a hardware based test device, such that it could reside in an integrated circuit (not shown) that is coupled to a printed circuit board (PCB) in any of a variety of computer systems. As an example, the system 10 including the memory test device 12 can be implemented in a personal computer (PC), a communications device, and/or a server.

The memory test device 12 is coupled to a plurality of memory modules 14, demonstrated in the example of FIG. 1 as four memory modules 14 labeled MEM 0 through MEM 3. The memory modules 14 can be implemented as any of a variety of different types of hardware memory devices, such as dual-inline memory modules (DIMMs) or portions of DIMMs. The memory test device 12 is configured to perform tests and/or detect and correct errors associated with data stored in the memory modules 14. As an example, for a memory test device 12 that implements a memory tester, the memory test device 12 can generate simulated data and write the simulated data to the memory modules 14. The memory test device 12 can then read the simulated data from the memory modules 14 to determine if the memory modules 14 are operating correctly. As another example, for a memory test device 12 that implements a memory scrubber, the memory test device 12 can step through the data that is stored in the memory modules 14 to detect errors in the data. Upon detecting an error in the data stored in a given register of a memory module 14, the memory test device 12 can correct the error in the data and write the corrected data back into the given register of the memory module 14. Thus, the memory test device 12 can be configured to implement a variety of data testing functionality.

As demonstrated in the example of FIG. 1 the memory test device 12 receives a signal CONTROL as an input. The signal CONTROL can be a signal that triggers the memory test device 12 to begin a test operation, such as a memory test or a memory scrub. The signal CONTROL can be a signal that is provided, for example, from a central processing unit (CPU). As an example, the memory test device 12 can receive the signal CONTROL to implement a test operation as a background operational process. For example, the memory test device 12 can test the memory modules 14 during boot-up of a computer that includes the system 10, or can periodically test or scrub the memory modules 14, such as at times of low CPU usage.

A given memory range of data corresponding to a range of address space can typically be interleaved amongst multiple memory modules, with each of the addresses identifying a memory storage unit. As used herein, the term "address" in reference to the given memory range is intended to encompass a virtual address, a physical address or any other means, which can include one or more levels of mapping, for to identifying (or referring to) one or more physical memory storage unit. For purposes of explanation, however, the following examples will describe the addresses in given memory range in relation to virtual addresses that identify the corresponding memory storage units of the memory modules 14.

Each memory storage unit can correspond to one or more cache line or other unit of memory storage, physically residing in one of the memory modules 14. Thus, in the example of FIG. 1, data for a given range of virtual addresses can be interleaved such that the data is distributed among the memory modules 14. As an example, a range of consecutive virtual addresses can include data that is physically stored in each of a different one of the memory modules 14 according to a predetermined interleave. The interleaving of data amongst the memory modules 14 can also be implemented in a repeated order. For example, data for a first virtual address can Include data stored in MEM 0, data for the next consecutive virtual address can include data stored in MEM 1, followed by data for the next consecutive virtual address stored in MEM 2, followed by data for the next consecutive virtual address stored in MEM 3. This interleave can repeat by storing the next virtual address in MEM 0 again in a repeated order. The interleaving scheme for the data stored in the memory modules 14 can be provided to the memory test device 12, demonstrated, in the example of FIG. 1 as a signal INTERLEAVE DATA.

The memory test device 12 can be configured to include one or more programmable stride values 16. The programmable stride value(s) 16 can be implemented such that the memory test device 12 selectively accesses the memory storage units in the memory modules 14. The stride value can he programmed based on the interleaving scheme, such as defined by the signal INTERLEAVE DATA. As an example, upon detecting a failure of MEM 2, the programmable stride value(s) 16 can be set such that the memory test device 12 can step through the interleaved data in the memory range of memory storage units and skip-over every memory storage unit having data that is stored in MEM 2. As a result the memory storage units in each of the remaining memory modules 14 (i.e., MEM 0, MEM 1, and MEM 3) can be accessed by the memory test device 12 without causing the memory test device 12 to stop a memory test or memory scrub operation and require a reset.

As another example, upon detecting a large number of errors in MEM 1, the stride value can be set to skip-over the memory storage units of all of the memory modules 14 except for the memory storage units associated with MEM 1. As a result, a memory test or memory scrub operation can focus only on MEM 1, such that MEM 1 can be debugged to determine a source of data errors. As yet another example, the programmable stride value(s) 16 can be set such that two stride values correspond to two of the memory modules 14, such that the memory test device 12 skips-over or accesses only the memory storage units associated with the two memory modules 14. Because the memory test device 12 is programmed with the interleaving scheme of the memory modules 14, and because the interleaving scheme can be arranged in a repeated order, the programmable stride value(s) 16 can simply be implemented as an offset number that allows the memory test device 12 to access the interleaved data in the memory storage units via as address pointer in the virtual memory space in a repeated sequence that skips-over the memory storage units in one or more of the memory modules 14.

The programmable stride value(s) 16 can be stored in one or more appropriate registers within the memory test device 12. For example, the programmable stride value(s) 16 can be programmed by a user of the computer that includes the system 10, such as during a debug process, similar to as described above. As another example, the programmable stride value(s) 16 can be set by the memory test device 12 upon detecting a failure of one of the memory modules 14, or upon detecting the presence of a predetermined number of errors associated with the accessed data from one of the memory modules 14. Therefore, the programmable stride value(s) 16 can be set dynamically and autonomously by the memory test device 12, such that the memory test or memory scrub operation can remain a background process that is transparent to a user of the computer that includes the system 10.

It is to be understood that the system 10 is not intended to be limited to the example of FIG. 1. Specifically, the system 10 is depicted simplistically for the sake of explanation. However, a variety of other devices could also be included in the system 10, such as, for example, additional memory modules 14 and/or additional memory test devices 12. Also, it is to be understood that the implementation of the programmable stride value(s) 16 is not intended to be limited to physical memory, but that one or more content addressable memories (CAMs) can be included in the memory modules 14. In addition, the memory modules 14 can also include other types of hardware memory devices, such as hard drives and/or peripheral memory devices. Furthermore, the implementation of the programmable stride value(s) 16 is not intended to be limited to memory test operations, such as memory testing and memory scrubbing. The programmable stride value(s) 16 can also be implemented in data read/write operations, such as during a reallocation of interleaved data hi the memory modules 14. Therefore, the system 10 can be configured to implement the programmable stride value(s) 16 in any of a variety of different ways.

Figure 2:
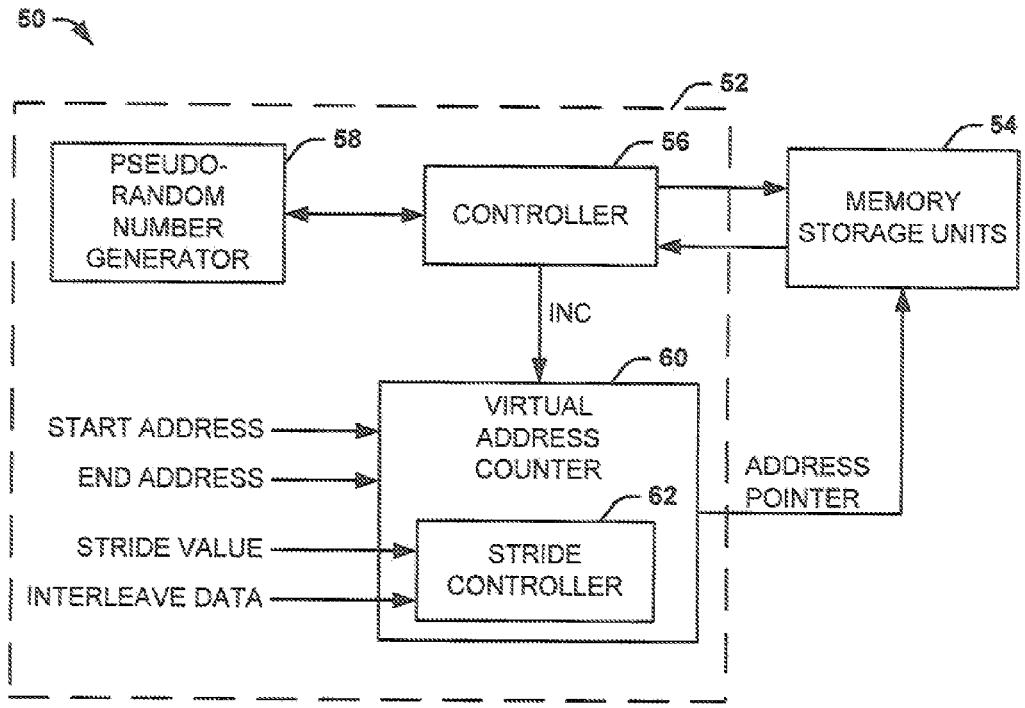
FIG. 2 depicts another example embodiment of a system to control access to interleaved memory.

FIG. 2 depicts another example embodiment of a system 50 to control access to interleaved memory. Similar to as described above in the example of FIG. 1, the system 50 includes a memory test device 52. In the example of FIG. 2, the memory test device 52 is implemented as a memory tester. The memory test device 52 is coupled to a plurality of memory modules (not shown), similar to the memory modules 14 in the example of FIG. 1. In the example of FIG. 2, the system 50 includes memory storage units 54 that define the memory range of the memory storage units of the plurality of memory modules coupled to the memory test device 52. Therefore, it is to be understood that the memory storage units 54 include memory storage units that store data interleaved across a plurality of separately accessible memory modules.

The memory test device 52 includes a controller 56 that is configured to control the system 50, including access to the memory storage units 54. The controller 56 is coupled to a pseudo-random number generator 58 that is configured to randomly generate simulated data. For example, upon the controller 56 accessing a given memory storage unit of the memory storage units 54, the controller 56 can command the pseudo-random number generator 58 to generate the simulated data. The controller 56 can also write the simulated data to the given accessed memory storage unit of the memory storage units 54. The controller 56 can thus read the simulated data from the given memory storage unit of the memory storage units 54, either immediately or at a later time, to determine if the memory storage unit or the corresponding memory module is operating correctly. Accordingly, the memory test device 52 is configured, in the example of FIG. 2, as a memory tester. However, it is to be understood that the memory test device 52 is not intended to be limited to a memory tester in the example of FIG. 2, but could instead be configured as a different type of memory test device, such as a memory scrubber.

To access the interleaved data in the memory storage units 54, the controller 56 can step through the memory storage units within a defined memory range. As such, the controller 56 is coupled to a virtual address counter 60 configured to increment an address pointer associated with the memory range defined by the memory storage units 54. The virtual address counter 60 is programmed with a virtual starting address and a virtual ending address of the memory range, demonstrated in the example of FIG. 2 as the signal START ADDRESS and the signal END ADDRESS, respectively. Thus, during a memory test operation, the controller 56 begins by accessing the memory storage unit address in the memory storage units 54 that is entered via the signal START ADDRESS. Upon accessing each of the memory storage units 54 and performing a given function (i.e., reading data and/or writing data), the controller 56 can provide a signal INC to the virtual address counter 60 to increment the address pointer of the memory storage units 54 to the next memory storage unit to be addressed via a signal ADDRESS POINTER. Thus, the controller 56 can step-through and access the memory storage units 54 via the virtual address counter 60.

The memory test device 52 also includes stride controller 62 that is configured to implement the programmable stride value(s), similar to the programmable stride value(s) 16 in the example of FIG. 1. The stride controller 62 receives one or more programmable stride values and interleave data as inputs, demonstrated in the example of FIG. 2 as the signal STRIDE VALUE and the signal INTERLEAVE DATA, respectively. Similar to as described above, the one or more programmable stride values can be provided from a user, from a CPU, or from the controller 56. For example, upon the controller 56 determining a failure associated with one or more of the memory modules that include the memory storage units 54, the controller 56 can set the programmable stride value such that the controller 56 no longer accesses the memory storage units 54 associated with the failed memory module. The interleave data provided to the stride controller 62 can include the interleaving scheme of the data that is stored in the memory storage units 54, particularly with regard to which of the memory storage units 54 reside in the respective memory modules. While the stride controller 62 is demonstrated in the example of FIG. 2 as part of the virtual address counter 60, it is to be understood that the stride controller 62 could be implemented separately from the virtual address counter 60.

The stride controller 62 thus operates in conjunction with the virtual address counter 60 to provide the signal ADDRESS POINTER to the memory storage units 54. Thus, the address of the memory storage units 54 accessed by the controller 56 can be set by either standard consecutive incrementation by the virtual address counter 60, by the stride value in the stride controller 62, or a combination of both. For example, the programmable stride value can be a test stride value, such that the programmable stride value is indicative of one or more of the memory modules that are to be accessed by the controller 56 in a repeated sequence. As another example, the programmable stride value can be a skip stride value, such that the programmable stride value is indicative of one or more of the memory modules that are to be skipped-over by the controller 56 in a repeated sequence.

Figure 3:
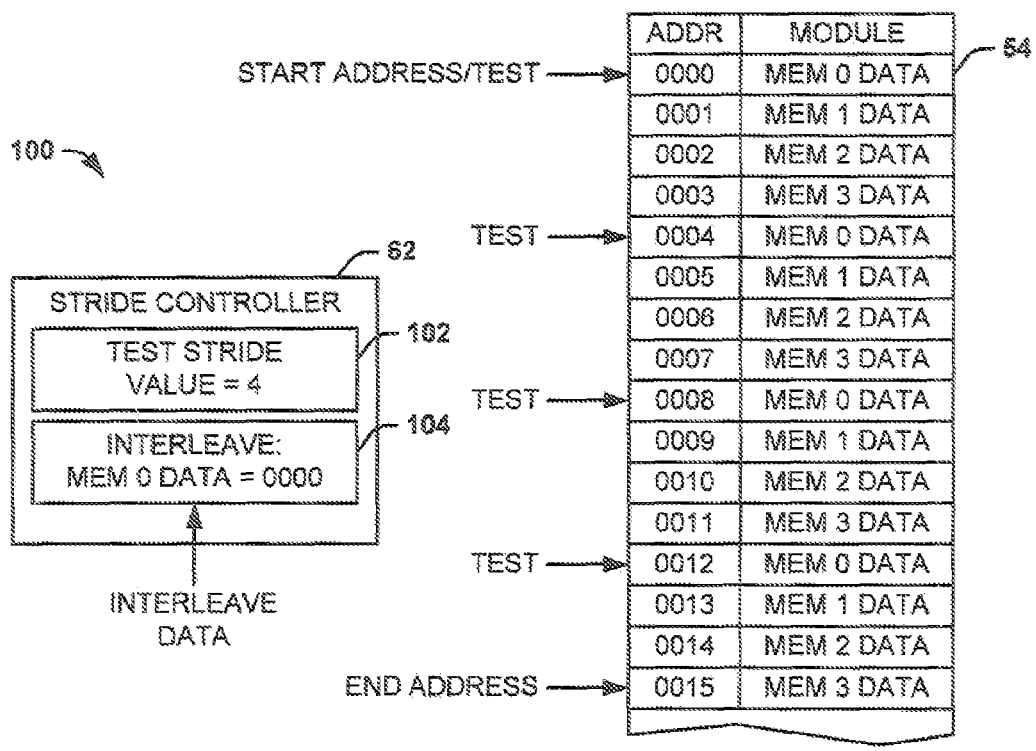
FIG. 3 depicts an example embodiment of a diagram that demonstrates implementing a stride value for accessing memory.

FIG. 3 depicts an example embodiment of a diagram 100 that demonstrates implementing a stride value for a range of virtual memory. The diagram 100 can demonstrate the operation of the system 10 in the example of FIG. 1 and system 50 in the example of FIG, 2. As such, reference is to be made to the examples of FIGS. 1 and 2, and like reference numbers of the examples of FIGS. 1 and 2 are used in the example of FIG. 3.

The diagram 100 demonstrates the stride controller 62, and that a programmable stride value stored within the stride controller 62 is a test stride value, as indicated at 102. The diagram 100 also demonstrates the memory storage units 54. In the example of FIG. 3, the memory storage units 54 are demonstrated as having a range of virtual addresses (0000 through 0015, and further demonstrate the interleaved data stored within. Specifically, the memory storage units 54 in the example of FIG. 3 demonstrate which of the virtual addresses correspond to specific memory modules MEM 0 through MEM 3, similar to the memory modules 14 described above in the example of FIG, 1. Thus, in the example of FIG. 3, the starting address of the memory range has been set for virtual address 0000 and the ending address has been set for virtual address 0015. The interleave data provided to the stride controller 62 indicates that virtual address 0000 has data that is stored in MEM 0 as indicated at 104. The interleave data can also indicate that there are four memory modules, such that the stride controller 62 can determine that virtual address 0001 has data that is stored in MEM 1, virtual address 0002 has data that is stored in MEM 2, and virtual, address 0003 has data that is stored in MEM 3. As such, the data in the memory storage units 54 is interleaved in a repeated order.

In the example of FIG. 3, the test stride value is set for four, as indicated at 102. Therefore, the address pointer increments by four after every operation of the controller 56. Accordingly, the controller 56 can access every fourth memory storage unit in the memory storage units 54 beginning with the memory unit corresponding to virtual address 0000. As an example, the controller 56 may have detected repeated errors of data associated with the memory storage units 54 that are associated with MEM 0, demonstrated as virtual addresses 0000, 0004, 0008, and 0012 in the example of FIG. 3. Thus, because the test stride value is set to four, the virtual address counter 60 can increment the address pointer by four every time the controller 56 provides the signal INC. In addition, because the stride controller receives the interleave data that correlates the data associated with each, of the memory modules MEM 0 through MEM 3 with the specific memory storage unit addresses, demonstrated at 104, the virtual address counter 60 can begin the incrementation by four upon accessing the appropriate memory storage unit in the memory storage units 54 (i.e., virtual address 0000 in the example of FIG. 3). Accordingly, the programmable stride value(s) can be set as a test stride value such that the memory test device 52 can test a specific memory module, demonstrated as memory module MEM 0 in the example of FIG. 3, and skip-over the remaining memory modules. As such, the specific memory module can be selected by identifying the starting virtual address and setting the stride value accordingly.

Figure 4:
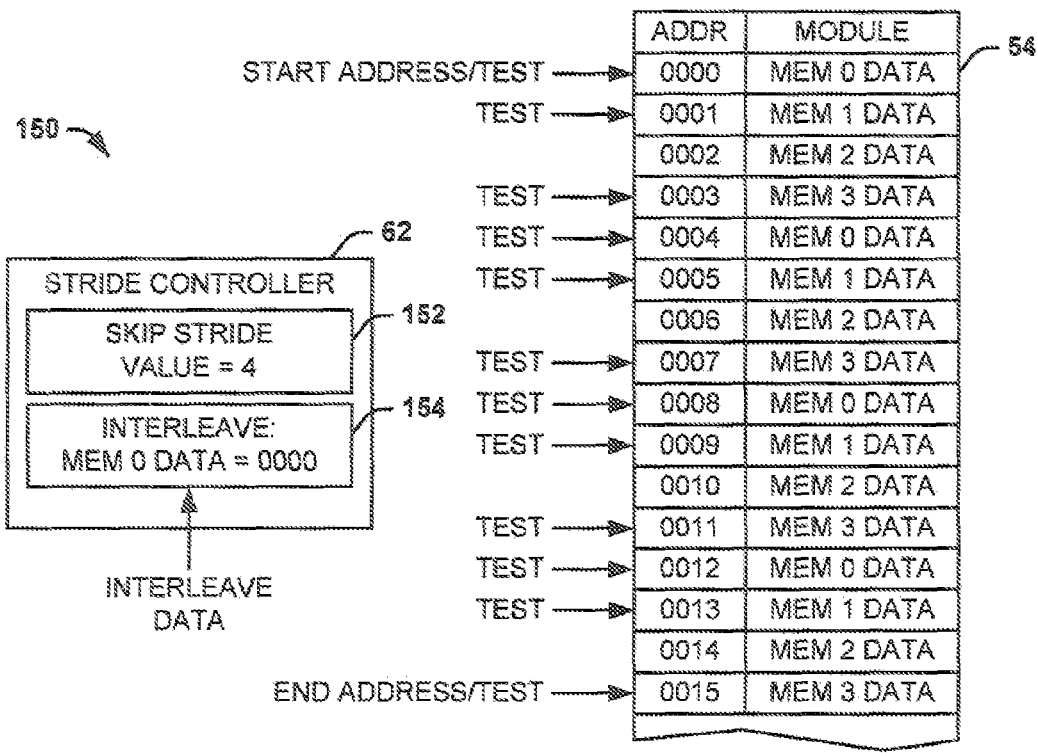
FIG. 4 depicts another example embodiment of a diagram that demonstrates implementing a stride value for accessing memory.

FIG. 4 depicts another example embodiment of a diagram 150 that demonstrates implementing a stride value for a range of virtual memory. Like the diagram 100 in the example of FIG. 3, the diagram 150 can demonstrate the operation of the system 10 in the example of FIG. 1 and system 50 in the example of FIG. 2. As such, reference is to be made to the examples of FIGS. 1 and 2, and like reference numbers of the examples of FIGS. 1 and 2 are used in the example of FIG. 4.

The diagram 150 demonstrates the stride controller 62, and that a programmable stride value stored within the stride controller 62 is a skip stride value, as indicated at 152. The diagram 150 also demonstrates the memory storage units 54. In the example of FIG. 4, the memory storage units 54 are demonstrated as having virtual addresses 0000 through 0015, and further demonstrate the interleaved data stored within. Specifically, the memory storage units 54 in the example of FIG. 4 demonstrate which of the memory storage units correspond to specific memory modules MEM 0 through MEM 3, similar to the memory modules 14 described above in the example of FIG, 1. Thus, in the example of FIG. 4, the starting address of the memory range has been set for virtual address 0000 and the ending address has been set for virtual address 0015. The interleave data provided to the stride controller 62 indicates that virtual address 0000 has data that is stored in MEM 0, as indicated at 154. The interleave data can also indicate that there are four memory modules, such that the stride controller 62 can determine that virtual address 0001 has data that is stored in MEM 1, virtual address 0002 has data that is stored in MEM 2, and virtual address 0003 has data that is stored in MEM 3. As such, the data in the memory storage units 54 is interleaved in a repeated order.

In the example of FIG. 4, the skip stride value is set for four, as indicated at 152. Thus, the address pointer can increment by one after every operation of the controller 56, and can increment by two after accessing every third memory storage unit. Thus, the controller 56 skips every fourth memory storage unit in the memory storage units 54. Accordingly, the controller 56 can access every memory storage unit in the memory storage units 54 except every fourth memory storage unit due to the incrementation by two of the address pointer after every third accessed memory storage unit.

As an example, the controller 56 may have detected failure associated with memory module MEM 2, demonstrated as memory storage units corresponding to virtual addresses 0002, 0006, 0010, and 0014 in the example of FIG. 4. Thus, because the skip stride value is set to four, the virtual address counter 60 can increment the address pointer by one every time the controller 56 provides the signal INC, until the controller 56 accesses the memory storage units corresponding to virtual addresses 0001, 0005, 0009, and 0013, respectively, after which the virtual address counter 60 can increment the address pointer by two. In addition, because the stride controller receives the interleave data that correlates the data associated with each of the memory modules MEM 0 through MEM 3 with the specific memory storage unit addresses, demonstrated at 154, the virtual address counter 60 can increment the address pointer at the appropriate times to skip-over the appropriate memory module (i.e., MEM 2 in the example of FIG. 4). Those skilled in the art will appreciate that other counting and control procedures may he implemented to skip-over a selected one of the memory modules.

It is to be understood that the system 50, the diagram 100, and the diagram 150 are not intended to be limited to the examples of FIGS. 2-4, respectively. For example, as described above, the system 50 is not intended to be limited to a memory tester, but could be a memory scrubber Instead of or in addition to a memory tester. Furthermore, multiple stride values can be implemented for a variety of different purposes. For example, in a memory system that includes N memory modules, where N is a positive integer, the memory test device 52 can access the memory storage units based on a plurality of programmable stride values, such that X of the N memory modules can be accessed, where X is a positive integer having a value $2 \leq X < N-1$. In the example of FIGS. 3 and 4, two separate stride values of four can be implemented to test or skip two consecutive memory modules, such as MEM 0 and MEM 1, such that each of the stride values corresponds to one of the two memory modules. As another example, a single stride value can be implemented to test or skip two memory modules, such as a stride value of two for memory modules MEM 0 and MEM 2 or memory modules MEM 1 and MEM 3 in the example of FIGS. 3 and 4. Therefore, programmable stride values can be implemented in any of a variety of ways in the system 50, and can be set dynamically and autonomously by the memory test device 52, such that the memory test or memory scrub operation can remain a background process that is transparent to a user of the computer that includes the system 50.

Figure 5:
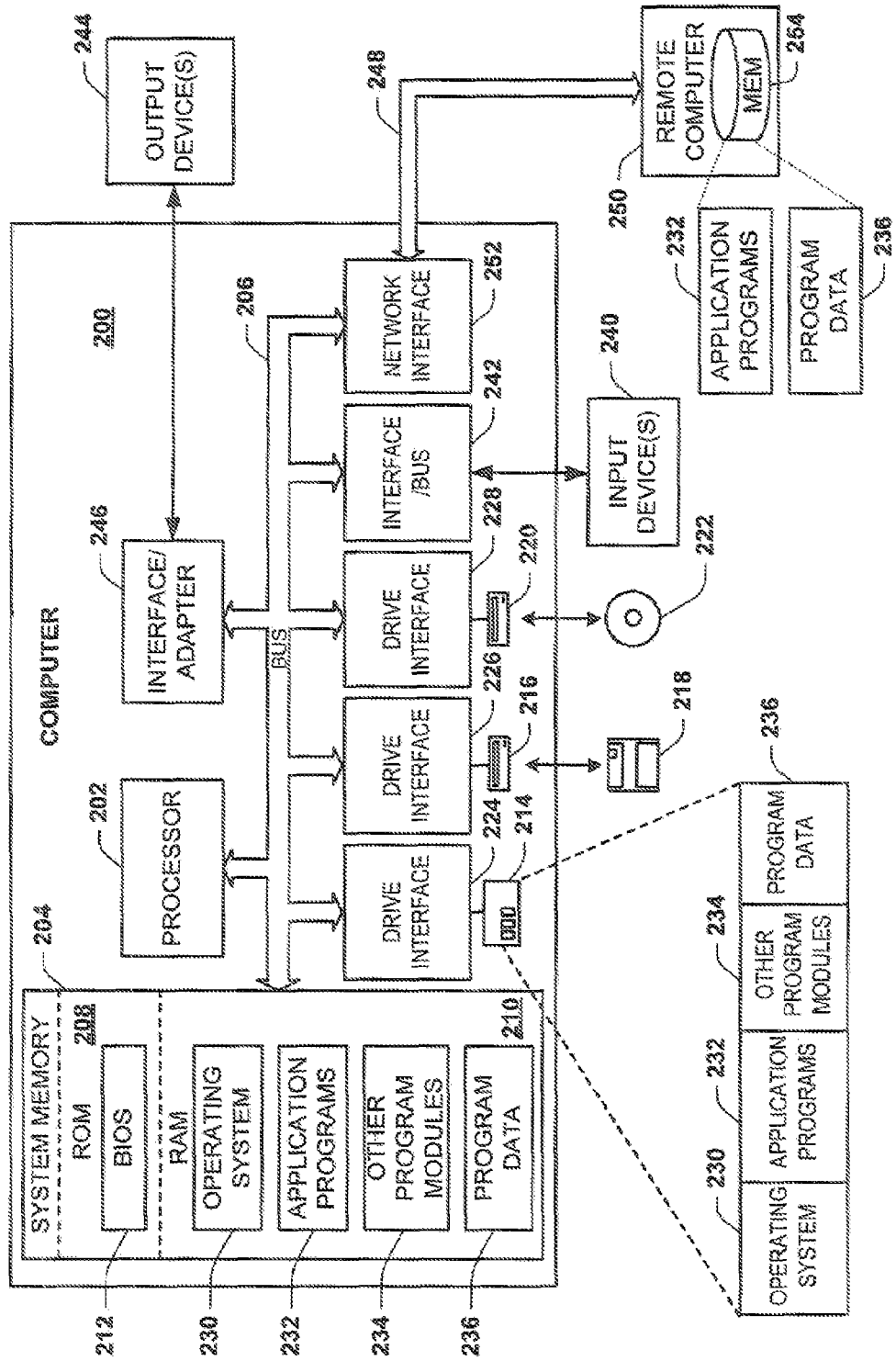
FIG. 5 depicts an example embodiment of a computer system that can implement a stride value to control access to interleaved memory.

FIG. 5 illustrates an example of a computer system 200 that can be employed to implement systems and methods described herein, such as based on computer executable instructions running on the computer system. The computer system 200 can be implemented on one or more general purpose networked computer systems, embedded computer systems, routers, switches, server devices, client devices, various intermediate devices/nodes and/or stand alone computer systems. Additionally, the computer system 200 can be implemented as part of a network analyzer or associated design tool running computer executable instructions to perform methods and functions, as described herein.

The computer system 200 includes a processor 202 and a system memory 204. A system bus 206 couples various system components, including the system memory 204 to the processor 202. Dual microprocessors and other multi-processor architectures can also be utilized as the processor 202. The system bus 206 can be implemented as any of several types of bus structures, including a memory bus or memory controller, a peripheral bus, and a local bus using any of a variety of bus architectures. The system memory 204 includes read only memory (ROM) 208 and random access memory (RAM) 210. A basic input/output system (BIOS) 212 can reside in the ROM 208, generally containing the basic routines that help to transfer information between elements within the computer system 200, such as a reset or power-up.

The computer system 200 can include a hard disk drive 214, a magnetic disk drive 216, e.g., to read from or write to a removable disk 218, and an optical disk drive 220, e.g., for reading a CD-ROM or DVD disk 222 or to read from or write to other optical media. The hard disk drive 214, magnetic disk drive 216, and optical disk drive 220 are connected to the system bus 206 by a hard disk drive interface 224, a magnetic disk drive interface 226, and an optical drive interface 234, respectively. The drives and their associated computer-readable media provide nonvolatile storage of data, data structures, and computer-executable instructions for the computer system 200. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like. A number of program modules may also be stored in one or more of the drives as well as in the RAM 210, including an operating system 230, one or more application programs 232, other program modules 234, and program data 236.

A user may enter commands and information into the computer system 200 through user input device 240, such as a keyboard, a pointing device (e.g., a mouse). Other input devices may include a microphone, a joystick, a game pad, a scanner, a touch screen, or the like. These and other input devices are often connected to the processor 202 through a corresponding interface or bus 242 that is coupled to the system bus 206. Such input devices can alternatively be connected to the system bus 206 by other interfaces, such as a parallel port, a serial port or a universal serial bus (USB). One or more out device(s) 244, such as a visual display device or printer, can also be connected to the system bus 206 via an interface or adapter 246.

The computer system 200 may operate in a networked environment using logical connections 248 to one or more remote computers 250. The remote computer 248 may be a workstation, a computer system, a router, a peer device or other common network node, and typically includes many or all of the elements described relative to the computer system 200. The logical connections 248 can Include a local area network (FAN) and a wide area network (WAN).

When used in a LAN networking environment, the computer system 200 can he connected to a local network through a network interface 252. When used in a WAN networking environment, the computer system 200 can include a modem (not shown), or can be connected to a communications server via a LAN. In a networked environment, application programs 232 and program data 236 depicted relative to the computer system 200, or portions thereof, may be stored in memory 254 of the remote computer 250.

By way of further example, the application programs 232 or the operating system 230 can include executable instructions programmed to implement one or more programmable stride values for accessing interleaved memory. For instance, the application programs 232 can include executable instructions that perform memory test operations and/or memory scrub operations to specific memory modules or skip-over specific memory modules in memory test and/or scrub operations based on one or more programmable stride values that work in conjunction with an address pointer for a given memory range of interleaved data. The instructions can provide interleave data to a virtual address counter, can set a stride value based on a determination of a failed memory module or errors in data stored on a specific memory module, and can selectively access memory storage units in a repeated sequence based on the stride value, such as described herein. The computer system 200 or the remote computer 250 can test or scrub interleaved data in a memory range without repeatedly stopping and resetting based on a failed memory module, and/or can target and debug specific memory modules that have potential data storage problems. Alternative executable instructions maybe embed in hardware associated with the memory 204 or in cache of the one or more processors 202.

Figure 6:
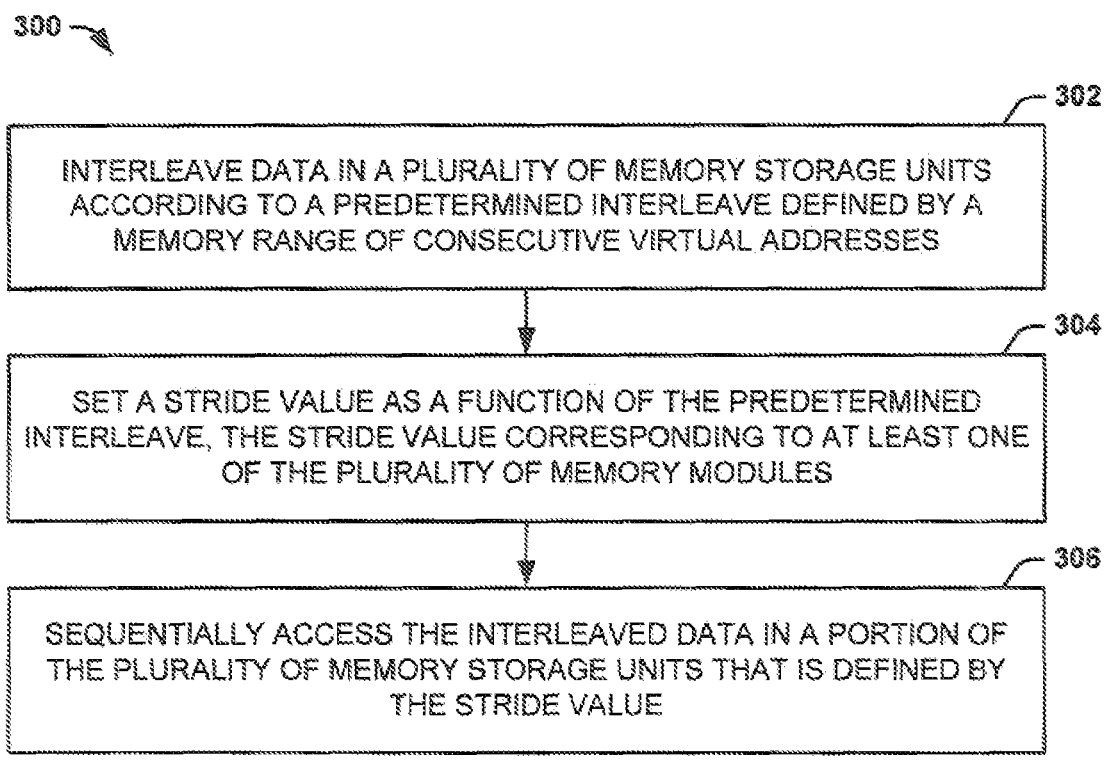
FIG. 6 is a flow diagram depicting an example embodiment of a method for implementing a snide value to control access to interleaved memory.

In view of the foregoing structural and functional features described above, certain methods will be better appreciated with reference to FIG. 6. It is to be understood and appreciated that the illustrated actions, in other embodiments, may occur In different orders and/or concurrently with other actions. Moreover, not all illustrated features may be required to implement a method. It is to be further understood that the following methodologies can be implemented in hardware (e.g., a computer or a computer network), software (e.g., as executable instructions running on one or more computer systems), or any combination of hardware and software.

FIG. 6 illustrates a flow diagram depicting an example embodiment of a method 300 for implementing a stride value for memory. At 302, data is interleaved in a plurality of memory storage units according to a predetermined interleave defined by a memory range of consecutive virtual addresses. At 304, a stride value that is a function of the predetermined interleave is set, where the stride value corresponds to at least one of the plurality of memory modules. At 306, the interleaved data in a portion of the plurality of memory storage units that is defined by the stride value is sequentially accessed.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A system comprising:
    A plurality of memory modules configured to stored interleaved data in a plurality of memory storage units according to a predetermined interleave, the plurality of memory storage units being defined by a memory range of consecutive addresses; and
    A memory test device configured to access a portion of the plurality of memory storage units in a sequence that repeat according to a programmable stride value,
    Wherein the programmable stride value comprises a skip stride value functionally related to the predetermined interleave, such that the memory storage units in the portion of the plurality of memory storage units are associated with all but one of the plurality of memory modules.

2. The system of claim 1, wherein the memory test device comprises a memory scrubber configured to detect and correct errors in the interleaved data in each of the memory storage units in the portion of the plurality of memory storage units.

3. The system of claim 1, wherein the system comprises a pseudo-random number generator configured to generate simulated data for each of the memory storage units in the portion of the plurality of memory storage units; and
wherein the memory test device comprises a memory tester configured to write the simulated data to each of the memory storage units in the portion of the plurality of memory storage units and to read the simulated data from each of the memory storage units in the portion of the plurality of memory storage units to detect errors.

4. The system of claim 1, wherein the programmable stride value comprises a test stride value functionally related to the predetermined interleave, such that the memory storage units in the portion of the plurality of memory storage units are associated with one of the plurality of memory modules.

5. The system of claim 1, wherein the number of the plurality of memory modules is equal to N, where N is a positive integer, and wherein the memory test device accesses the memory storage units in the portion of the plurality of memory storage units in the repeated sequence based on a plurality of programmable stride values, such that the memory storage units in the portion of the plurality of memory storage units are associated with X of the plurality of memory modules, where X is a positive integer having a value $2 \leq X < N-1$.

6. The system of claim 1, wherein the memory test device generates the programmable stride value in response to determining a failure of at least one of the plurality of memory modules.

7. The system of claim 6, wherein the memory test device generates the programmable stride value such that the memory storage units in the portion of the plurality of memory storage units exclude the failed at least one of the plurality of memory modules.

8. The system of claim 1, wherein the memory test device generates the programmable stride value in response to detecting a plurality of errors associated with the interleaved data stored in at least one of the plurality of memory modules, the programmable stride value being generated such that the memory storage units in the portion of the plurality of memory storage units correspond to the at least one of the plurality of memory modules that stores the data in which the plurality of errors were detected.

9. The system of claim 1, wherein tire programmable stride value is associated with an amount that an address pointer associated with the memory range of the consecutive addresses corresponding to the memory storage units is incremented.

10. A method comprising:
    Interleaving data in a plurality of memory storage units according to a predetermined interleave defined by a memory range of consecutive addresses;
    Setting a stride value as a function of the predetermined interleave, the stride value corresponding to at least one of the plurality of memory modules; and
    Sequentially accessing the interleaved data in a portion of the plurality of memory storage units that is defined by the stride value, wherein sequentially accessing the interleaved data comprises skipping-over the memory storage units in the portion of the plurality of memory storage units that are associated with the at least one of the plurality of memory modules to which the stride value corresponds.

11. The method of claim 10, wherein sequentially accessing the interleaved data comprises:
    detecting errors in the interleaved data in each of the memory storage units in the portion of the plurality of memory storage units;
    correcting the detected errors to generate corrected data; and writing the corrected data to each of the memory storage unit in the portion of the plurality of memory storage unit.

12. The method of claim 10, wherein sequentially accessing the interleaved data comprises:
generating simulated data for each of the memory storage units in the portion of the plurality of memory storage units;
writing the simulated data to each of the respective memory storage units in the portion of the plurality of memory storage units; and
reading the simulated data from the respective memory storage units in the portion of the plurality of memory storage units to detect errors.

13. The method of claim 10, wherein sequentially accessing the interleave data comprises accessing the memory storage units in the portion of the plurality of memory storage units that are associated with the at least one of the plurality of memory modules to which the stride value corresponds.

14. The method of claim 10, wherein setting the stride value comprises programmably setting the stride value in response to at least one of determining a failure of at least one of the plurality of memory modules and detecting a plurality of errors associated with the interleaved data stored in at least one of the plurality of memory modules.

15. A computer readable medium comprising instruction for implementing the method of claim 10.

16. A system comprising:
Means for storing interleaved data, the interleaved data being configured in a plurality of memory storage units defined by a memory range of addresses;
Means for sequentially accessing the interleaved data from the plurality of memory storage unites; and
Means for enabling the means for sequentially accessing the interleaved data to skip-over a portion of the plurality of memory storage units that is associated with at least one of the means for storing the interleaved data,
Wherein the means for sequentially accessing the interleaved data comprises means for generating a stride value in response to one of determining a failure of at least one of the means for storing the interleaved data and detecting a plurality of errors associated with the interleaved data stored in at least one of a plurality of memory modules that define the means for storing the interleaved data, the stride value being determinative of the at least one of the means for storing the interleaved data.

17. The system of claim 16, wherein the means for sequentially accessing the interleaved data comprises means for at least one of testing the means for storing the interleaved data and detecting and correcting errors associated with the interleaved data.

* * * * *

UNITED STATES PATENT AND TRADEMARK OFFICE
CERTIFICATE OF CORRECTION

| | | |
|---|---|---|
| PATENT NO. | : 7,694,193 B2 | Page 1 of 1 |
| APPLICATION NO. | : 11/685395 | |
| DATED | : April 6, 2010 | |
| INVENTOR(S) | : Larry J. Thayer et al. | |

It is certified that error appears in the above-identified patent and that said Letters Patent is hereby corrected as shown below:

In column 9, line 45, in Claim 1, delete "A" and insert -- a --, therefor.

In column 9, line 45, in Claim 1, delete "stored" and insert -- store --, therefor.

In column 9, line 50, in Claim 1, delete "A" and insert -- a --, therefor.

In column 9, line 52, in Claim 1, delete "repeat" and insert -- repeats --, therefor.

In column 9, line 53, in Claim 1, delete "Wherein" and insert -- wherein --, therefor.

In column 10, line 40, in Claim 9, delete "tire" and insert -- the --, therefor.

In column 10, line 47, in Claim 10, delete "Interleaving" and insert -- interleaving --, therefor.

In column 10, line 50, in Claim 10, delete "Setting" and insert -- setting --, therefor.

In column 10, line 53, in Claim 10, delete "Sequentially" and insert -- sequentially --, therefor.

In column 12, line 2, in Claim 16, delete "Means" and insert -- means --, therefor.

In column 12, line 5, in Claim 16, delete "Means" and insert -- means --, therefor.

In column 12, line 6, in Claim 16, delete "unites;" and insert -- units; --, therefor.

In column 12, line 7, in Claim 16, delete "Means" and insert -- means --, therefor.

In column 12, line 11, in Claim 16, delete "Wherein" and insert -- wherein --, therefor.

Signed and Sealed this

Twenty-ninth Day of June, 2010

David J. Kappos
*Director of the United States Patent and Trademark Office*